US012222948B1

(12) United States Patent
Padubidri et al.

(10) Patent No.: US 12,222,948 B1
(45) Date of Patent: Feb. 11, 2025

(54) IDENTIFICATION AND REMEDIATION OF ISSUES ENCOUNTERED ON A USER INTERFACE OF A WEB-BASED SYSTEM

(71) Applicant: Dell Products L.P., Round Rock, TX (US)

(72) Inventors: Subramanya Padubidri, Bangalore (IN); Akash Sinha, Patna (IN); Radhika Singh, Bhilwara (IN); Saumya Jha, Bhubaneswar (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/524,625

(22) Filed: Nov. 30, 2023

(51) Int. Cl.
  *G06F 16/2455* (2019.01)
  *G06F 40/279* (2020.01)
  *G06Q 10/083* (2024.01)
  *H04L 51/216* (2022.01)

(52) U.S. Cl.
  CPC ...... *G06F 16/24565* (2019.01); *G06F 40/279* (2020.01); *G06Q 10/083* (2013.01); *H04L 51/216* (2022.05)

(58) Field of Classification Search
  CPC ............ G06F 16/24565; G06F 40/279; G06Q 10/083; H04L 51/216
  USPC ....................................................... 707/702
  See application file for complete search history.

(56) References Cited

U.S. PATENT DOCUMENTS

| | | | | |
|---|---|---|---|---|
| 10,268,711 B1 * | 4/2019 | Chappell | ............... | G06F 16/215 |
| 10,282,774 B2 * | 5/2019 | Kaplan | .............. | G06Q 30/0635 |
| 10,394,612 B2 * | 8/2019 | Grigoryan | ............ | G06F 9/5072 |
| 10,762,280 B2 * | 9/2020 | Bradley | ................ | G06F 40/134 |
| 11,144,930 B2 * | 10/2021 | Sosale | .................. | G06Q 30/016 |
| 11,231,986 B1 * | 1/2022 | Silakov | ................ | G06F 11/079 |

(Continued)

FOREIGN PATENT DOCUMENTS

| | | | | |
|---|---|---|---|---|
| CN | 110287056 A | * | 9/2019 | .......... G06F 11/0751 |
| CN | 115328897 A | * | 11/2022 | |

OTHER PUBLICATIONS

P. M. Nadkarni et al., "Natural Language Processing: An Introduction," Journal of the American Medical Informatics Association, vol. 18, Sep. 2011, pp. 544-551.

(Continued)

*Primary Examiner* — Phuong Thao Cao

(74) *Attorney, Agent, or Firm* — Ryan, Mason & Lewis, LLP

(57) ABSTRACT

An apparatus comprises at least one processing device configured to identify issues encountered on a user interface of a web-based system, the issues being associated with data structures consolidating data from backend applications supporting the web-based system. The at least one processing device is also configured to determine which of the backend applications are the source of respective ones of the issues. The at least one processing device is further configured to generate a prioritization of the issues based at least in part on supplemental information comprising at least one of service request data and user feedback relating to the data structures. The at least one processing device is further configured to trigger the backend applications supporting the web-based system to remediate the issues based at least in part on the generated prioritization.

20 Claims, 14 Drawing Sheets

(56) References Cited

U.S. PATENT DOCUMENTS

| | | | | |
|---|---|---|---|---|
| 11,755,455 | B1* | 9/2023 | Kuo | G06F 11/3664 |
| | | | | 717/124 |
| 11,797,918 | B2* | 10/2023 | Azad | G06Q 10/0631 |
| 11,892,919 | B1* | 2/2024 | Sahter | H04L 67/1068 |
| 2008/0162688 | A1* | 7/2008 | Reumann | G06Q 30/02 |
| | | | | 709/224 |
| 2016/0321739 | A1* | 11/2016 | Corlett | G06Q 30/0635 |
| 2017/0046246 | A1* | 2/2017 | Kaulgud | G06Q 30/0282 |
| 2018/0137295 | A1* | 5/2018 | Sharma | G06F 21/606 |
| 2020/0364285 | A1* | 11/2020 | Isager | G06F 40/106 |
| 2021/0160719 | A1* | 5/2021 | Winter | G06N 3/045 |
| 2021/0306236 | A1* | 9/2021 | Singh | G06N 5/01 |
| 2022/0121723 | A1* | 4/2022 | Page | G06F 11/0784 |
| 2022/0276901 | A1* | 9/2022 | Ravala | G06F 9/5038 |
| 2024/0345911 | A1* | 10/2024 | Bellam | G06F 11/0709 |

OTHER PUBLICATIONS

B. Mahesh, "Machine Learning Algorithms—A Review," International Journal of Science and Research, vol. 9, No. 1, Jan. 2020, pp. 381-386.

N. C. Dang et al., "Sentiment Analysis Based on Deep Learning: A Comparative Study," Electronics, Mar. 14, 2020, vol. 9, No. 483, 29 pages.

NLTK Project, "Natural Language Toolkit," https://www.nltk.org/, Jan. 2, 2023, 4 pages.

\* cited by examiner

USER VISIT DATA 401

```
{
    User Visit Date : 2023-05-01T13:11:09,
    Order Number : 12345,
    Issue Type : MissingInvoice,
    Country : UK,
    Source Page : "Order-Details",
    Order Status : "Shipped",
    InvoiceNumber : "",
    CarrierLink:" ",
    Order Value : 1000,
    UserType : "Premier",
}
```

SERVICE CASE DATA 403

```
{
    Case Created Date : 2023-05-03T13:11:09
    Case Number : 91234,
    Order Number : 12345
    Case Description : "Unable to fetch invoice",
    Case Priority: "High"
}
```

SOCIAL FEED DATA 405

```
{
    "OrderNumber":"123456",
    "Comment": "Download invoice not working"
}
```

RANKING DATA 407

```
{
    Issue : "Missing Invoice issue"
    IssueFrequency_UserVisit : 23,
    IssueFrequency_SRCase : 11,
    IssueFrequency_SocialFeed : 5,
    UserType : "Premier",
    Rank : 1
}
```

FIG. 4

USER VISIT DATA 601

```
{
    User Visit Date : 2023-05-01T13:11:09,
    Order Number : 12345,
    Issue Type : MissingInvoice,
    Country : UK,
    Source Page : "Order-Details",
    Order Status : "Shipped",
    InvoiceNumber : "",
    CarrierLink:" ",
    Order Value : 1000,
    UserType : "Premier",
}
```

SERVICE CASE DATA 603

```
{
    "CreatedDate": "2022-07-01T00:00:49.1110000Z",
    "IssueType": "MissingInvoiceNumber",
    "SourcePage": "",
    "PulseId": "Care00007",
    "Product": "OrderStatus",
    "OrderNumber": "951369867",
    "Country": "India",
    "OrderStatus": "Shipped",
    "OrderType": "",
    "UserType": "Premier",
    "OrderDate": "Jun 24, 2022",
    "user_case": 1
}
```

SOCIAL FEED DATA 605

```
{
    "OrderNumber":"123456",
    "Comment": "Download invoice not working"
    "Rating": "0",
    "Country": "UK"
}
```

```
US, CA – 0, BR, CO, MEX – 1, IN, CH, JP, AU, NZ – 2, GE, IT, UK, SW, IR, FR, NE, BE, SO, NO – 3 def map_country(x):
    if x=='United States' or x=='Canada':
        return 0
    elif x=='Brazil' or x=='Mexico' or x=='Colombia':
        return 1
    elif x=='India' or x=='China' or x=='Japan' or x=='Australia' or x=='New Zealand':
        return 2
    else:
        return 3 df['MappedCountry']=df['country'].apply(lambda x:map_country(x))
df['MappedCountry'].head()
```

703

```
def map_issues(x):
    if x=='Tracking':
        return 0
    elif x=='Billing':
        return 1
    elif x=='Cancel Order':
        return 2
    elif x=='Other':
        return 4
    else:
        return 4 df['MappedIssues']=df['purpose_of_visit_hierarchy_level3'].apply(lambda x:map_country(x))
df['MappedIssues'].head()
```

```
translator = Translator()
df['translated_verbatim"]=df['Verbatim'].apply(translator.translate).apply(geattr, args=(;'text',))
```

803

```
df['cleaner_verbatim']=df['translated_verbatim'].apply(lambda x: ' '.join([item for item in x.split()
if item.lower() not in set(stopwords.words('english'))]))
df['cleaner.verbatim'].head()
```

805

```
def text_cleaner(text) :
    text = text.lower() #convert to lowercase
    text = re.sub(r '[^a-zA-Z0-9.-@\s]', ' ', text) #remove punctuation and special characters
    text = re.sub(r '\s+', ' ', text) #remove extra whitespace
    text = re.sub(r 'https?://\S+', ' ', text) #remove URLs
    text = re.sub(r "#", " ", text)
    return text
```

807

```
df['cleaned_verbatim"]=df.apply(lambda x:text_cleaner(x['cleaner_verbatim']),axis=1)
```

809

```
text = list(df['cleaned_verbatim'])

vectorizer = HashingVectorizer(n_features=20)

vector3 = vectorizer.transform(text)

vector3[1210]=df['MappedCountry']
vector3[1211]=df['MappedIssues']
vector3[1212]=df['MappedRating']
```

```
k_means_model = Kmeans(n_clusters=4, max_iter=1000, random_state=True, n_init=50)
#n_clusters is K value
#x=df_train[['MappedCountry', 'MappedIssues', 'MappedRating']]
#res = k_means_model.fit_predict(x)
ans = k_means_model.fit_predict(vector3)
k_means_model.cluster_centers_ cluster_assignment = k_means.model.labels_
cluster_list = cluster_assignment.tolist()
```

903

```
#Prediction Mapping
# 3 → extremely pain causing comments
# 2 → pain causing comments
# 1 → better comments
0 → good comments df['rating_prediction']=cluster_list
df[['rating_prediction', 'cleaned_verbatim']].tail()
```

905

| Fiscal Week | Rating Prediction | Cleaned Verbatim |
|---|---|---|
| 1 | 3 | tracking system takes time update notebook... |
| 2 | 2 | web site work log get software |
| 2 | 2 | web site work log get software |
| 3 | 3 | cant chat support |
| 3 | 3 | cant chat support |

FIG. 9

| Priority | Features | Feature Value | Weight | Distress Score = Feature*Weight |
|---|---|---|---|---|
| 1 | Customer type | 1 | 7 | |
| 1.i | Premier/Partner Business-to-Business (B2B) users | 1*3 | 7*3 | 7*3 |
| 1.ii | Transactional users | 1*2 | 7*2 | |
| 1.iii | Guest/Unauthorized users | 1*1 | 7*1 | |
| 2 | Customer comment sentiment | 2 | 6 | 2*6 |
| 3 | Number of service requests created | 3 | 5 | 3*5 |
| 4 | Frequency of issues associated with the order number the customer has issue with | 5 | 4 | 5*4 |
| 5 | Order amount | 10,000 | 3 | 10,000*3 |
| 6 | Revenue Sales | 2313 | 2 | 2313*2 |
| 7 | Frequency of issues happened on the day the issue was logged in | 12312 | 1 | 12313*1 |
| | Prediction Rank = Sum of feature value*weight | | | 7*3+2*6+3*5+5*4+ 10,000*3+2313*2+ 12313*1 |

```
import pickle
import pandas as pd

# Import the dataset
df = pd.read_csv("classification.csv")

# Create a new column for the ranking
df["ranking"] = df[["customer_type*weight","amount*weight","service_request_count*weight",
"product_revenue_sales*weight","sr_associated_issue_count*weight",
"issue_count_on_logged_date*weight","customer_comment_sentiment*weight",
"social_media_sentiment*weight"]].rank(method="dense", ascending=False)

# Sort the data by the ranking column
df = df.sort_values("ranking",ascending=False)

# Print the ranked data
print(df)
```

IDENTIFICATION AND REMEDIATION OF ISSUES ENCOUNTERED ON A USER INTERFACE OF A WEB-BASED SYSTEM

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

As the value and use of information continues to increase, individuals and businesses seek additional ways to process and store information. Information processing systems may be used to process, compile, store and communicate various types of information. Because technology and information processing needs and requirements vary between different users or applications, information processing systems may also vary (e.g., in what information is processed, how the information is processed, how much information is processed, stored, or communicated, how quickly and efficiently the information may be processed, stored, or communicated, etc.). Information processing systems may be configured as general purpose, or as special purpose configured for one or more specific users or use cases (e.g., financial transaction processing, airline reservations, enterprise data storage, global communications, etc.). Information processing systems may include a variety of hardware and software components that may be configured to process, store, and communicate information and may include one or more computer systems, data storage systems, and networking systems.

SUMMARY

Illustrative embodiments of the present disclosure provide techniques for identification and remediation of issues encountered on a user interface of a web-based system.

In one embodiment, an apparatus comprises at least one processing device comprising a processor coupled to a memory. The at least one processing device is configured to identify a plurality of issues encountered on a user interface of a web-based system, the plurality of issues being associated with one or more data structures consolidating data from two or more of a plurality of backend applications supporting the web-based system. The at least one processing device is also configured to determine, for each of the plurality of issues, which of the plurality of backend applications supporting the web-based system are the source of at least one of missing and erroneous data resulting in respective ones of the plurality of issues. The at least one processing device is further configured to generate a prioritization of the plurality of issues, the prioritization being determined based at least in part on supplemental information for the one or more data structures associated with the plurality of issues, the supplemental information comprising at least one of service request data and user feedback relating to the one or more data structures. The at least one processing device is further configured to trigger at least a given one of the plurality of backend applications supporting the web-based system to remediate at least a given one of the plurality of issues associated with a given one of the one or more data structures based at least in part on the generated prioritization of the plurality of issues, the given backend application being the determined source of the given issue.

These and other illustrative embodiments include, without limitation, methods, apparatus, networks, systems and processor-readable storage media.

BRIEF DESCRIPTION OF THE DRAWINGS

FIG. 4 shows examples of data models for user visit data, service case data, social feed data and ranking data in an illustrative embodiment.

FIG. 6 shows examples of user visit data, service case data and social feed data for use in calculating the prioritizing of user order experience issues in an illustrative embodiment.

FIG. 7 shows pseudocode for performing mapping of non-numeric categorical data for sentiment analysis in an illustrative embodiment.

FIG. 8 shows pseudocode for performing natural language processing and converting text into formats suitable for input into machine learning models in an illustrative embodiment.

FIG. 9 shows pseudocode for implementing a machine learning classifier and prediction mapping in an illustrative embodiment.

FIG. 10 shows a table of data used for setting the ranking of user order experience issues in an illustrative embodiment.

FIG. 11 shows pseudocode for performing rankings of user order experience issues in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
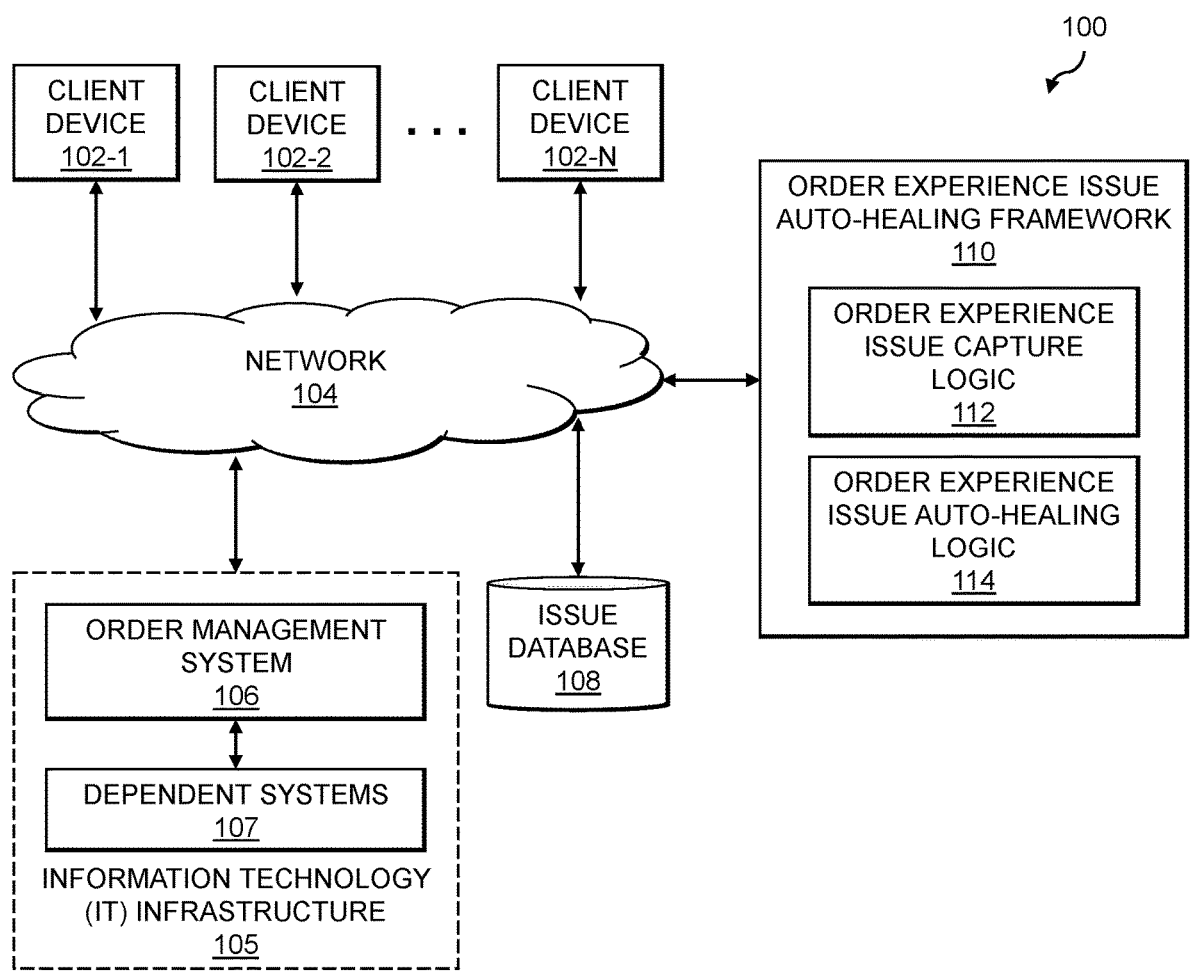
FIG. 1 is a block diagram of an information processing system configured for identification and remediation of issues encountered on a user interface of a web-based system in an illustrative embodiment.

FIG. 1 shows an information processing system 100 configured in accordance with an illustrative embodiment. The information processing system 100 is assumed to be built on at least one processing platform and provides functionality for identification and remediation of issues (e.g., order experience issues) encountered on a user interface of a web-based system (e.g., an order management system). The information processing system 100 includes a set of client devices 102-1, 102-2, . . . 102-N (collectively, client devices 102) which are coupled to a network 104 used to access an order management system 106 that runs on information technology infrastructure 105. The order management system 106 may comprise, for example, a website or application that is accessed by users of the client devices 102 for managing orders (e.g., of products offered by an enterprise, organization or other entity operating the order management system 106, where the order management system 106 may be part of an e-commerce platform). The order management system 106 utilizes dependent systems 107 (e.g., backend applications) for rendering a user interface (UI) displaying a consolidated view of order data from multiple ones of the dependent systems 107, the UI also providing various functionality for performing self-servicing actions related to orders. The order management system 106 and dependent systems 107 may run on various IT assets of the IT infrastructure 105, where the IT assets may include physical and virtual computing resources. Also coupled to the network 104 is an issue database 108 and an order experience issue auto-healing framework 110.

The order experience issue auto-healing framework 110 is configured to analyze behavior of users (e.g., of the client devices 102) on the order management system 106, to detect and remediate order experience issues (e.g., relating to orders placed by users on the order management system 106). To do so, the order experience issue auto-healing framework 110 implements order experience issue capture logic 112 and order experience issue auto-healing logic 114. The order experience issue capture logic 112 is configured to analyze user behavior on the order management system 106 to proactively and reactively identify order experience issues, which may be stored in the issue database 108. The issue database 108 may also enrich order experience issues with data from additional data sources, such as user feedback (e.g., from social media feeds), service requests, etc. The order experience issue capture logic 112 is also configured to determine the root causes of the order experience issues (e.g., which of the dependent systems 107 are the sources of missing or invalid data resulting in the order experience issues). The order experience issue auto-healing logic 114 is configured to use such data to rank or prioritize the order experience issues, and to trigger auto-healing actions in the dependent systems 107 (e.g., determined to be the root causes of the order experience issues) in accordance with the ranking or prioritization of the order experience issues. The order experience issue auto-healing logic 114 is further configured to notify users (e.g., of the client devices 102) of the fixes made for the order experience issues. Such notifications may be delivered through updates to a UI of the order management system 106, through communications over other channels (e.g., out-of-band communication channels such as emails, messages, etc. which are sent to the client devices 102 of the users, or host agents running on the client devices 102).

The client devices 102 may comprise, for example, physical computing devices such as mobile telephones, laptop computers, tablet computers, desktop computers, Internet of Things (IoT) devices, or other types of devices. Such devices are examples of what are more generally referred to herein as "processing devices." Some of these processing devices are also generally referred to herein as "computers." The client devices 102 in some cases may also or alternatively comprise virtualized computing resources, such as virtual machines (VMs), software containers, etc.

The client devices 102 may in some embodiments comprise respective computers associated with different companies, entities, enterprises or other organizations. In addition, at least portions of the system 100 may also be referred to herein as collectively comprising one or more "enterprises." Numerous other operating scenarios involving a wide variety of different types and arrangements of processing nodes are possible, as will be appreciated by those skilled in the art.

The network 104 is assumed to comprise a global computer network such as the Internet, although other types of networks can be used, including a wide area network (WAN), a local area network (LAN), a satellite network, a telephone or cable network, a cellular network, a wireless network such as a WiFi or WiMAX network, or various portions or combinations of these and other types of networks.

The order management system 106 running on IT assets of the IT infrastructure 105 may be associated with or operated by one or more enterprises, organizations or other entities. The order management system 106 and the IT infrastructure 105 on which the order management system 106 and dependent systems 107 runs may therefore be referred to as an enterprise system. As used herein, the term "enterprise system" is intended to be construed broadly to include any group of systems or other computing devices. In some embodiments, an enterprise system includes cloud infrastructure comprising one or more clouds (e.g., one or more public clouds, one or more private clouds, one or more hybrid clouds, combinations thereof, etc.). The cloud infrastructure may also host at least a portion of the client devices 102. A given enterprise system may host assets that are associated with multiple enterprises (e.g., two or more different businesses, entities or other organizations). For example, in some cases the IT infrastructure 105 may host multiple different order management systems associated with different enterprises (e.g., different vendors) which offer their products and services to users of the client devices 102. Each of such multiple order management systems may utilize the order experience issue auto-healing framework 110 (or another instance thereof) for detecting order experience issues and performing auto-healing thereof. The issue database 108 and/or the order experience issue auto-healing framework 110, although shown in FIG. 1 as being implemented external to the IT infrastructure 105, may in other embodiments be at least partially implemented using IT assets of the IT infrastructure 105.

The issue database 108, as discussed above, is configured to store and record various information that is used by the order experience issue auto-healing framework 110 in detecting and auto-healing of order experience issues. Such data may include events or issues captured related to order experiences encountered on the order management system 106, supplementary information from social feeds, user feedback, user visit order data, user communication records, etc. The issue database 108 in some embodiments is implemented using one or more storage systems or devices associated with the order experience issue auto-healing framework 110. In some embodiments, one or more of the storage systems utilized to implement the issue database 108 comprises a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the client devices 102, the order management system 106, the dependent systems 107, the issue database 108 and the order experience issue auto-healing framework 110, as well as to support communication therebetween and with other related systems and devices not explicitly shown.

Although shown in the FIG. 1 embodiment as being separate from the client devices 102 and the order management system 106 (e.g., as a stand-alone server, set of servers or other type of system coupled via the network 104 to the client devices 102 and the order management system 106), the order experience issue auto-healing framework 110 or at least portions thereof (e.g., one or more of the order experience issue capture logic 112 and the order experience issue auto-healing logic 114) may in other embodiments be implemented at least in part internally to one or more of the client devices 102 and/or the order management system 106. In some embodiments, the order experience issue auto-healing framework 110 is implemented as a service that the order management system 106 (and potentially other distinct order management systems) and/or the client devices 102 subscribe to.

The client devices 102, the order management system 106, the dependent systems 107, the issue database 108 and the order experience issue auto-healing framework 110 in the FIG. 1 embodiment are assumed to be implemented using at least one processing device. Each such processing device generally comprises at least one processor and an associated memory, and implements at least a portion of the functionality of such elements, such as one or more of the order experience issue capture logic 112 and the order experience issue auto-healing logic 114 of the order experience issue auto-healing framework 110.

It is to be appreciated that the particular arrangement of the client devices 102, the order management system 106, the dependent systems 107, the issue database 108 and the order experience issue auto-healing framework 110 illustrated in the FIG. 1 embodiment is presented by way of example only, and alternative arrangements can be used in other embodiments. As discussed above, for example, the order experience issue auto-healing framework 110 may in some cases be implemented at least in part internal to one or more of the client devices 102 and/or the order management system 106. At least portions of the order experience issue capture logic 112 and the order experience issue auto-healing logic 114 may be implemented at least in part in the form of software that is stored in memory and executed by a processor.

It is to be understood that the particular set of elements shown in FIG. 1 for auto-healing of order experience issues encountered on the order management system 106 is presented by way of illustrative example only, and in other embodiments additional or alternative elements may be used. Thus, another embodiment may include additional or alternative systems, devices and other network entities, as well as different arrangements of modules, logic and other components.

The client devices 102, the order management system 106, the dependent systems 107, the issue database 108, the order experience issue auto-healing framework 110 and other portions of the system 100, as will be described above and in further detail below, may be part of cloud infrastructure.

The client devices 102, the order management system 106, the dependent systems 107, the issue database 108, the order experience issue auto-healing framework 110, and other components of the information processing system 100 in the FIG. 1 embodiment are assumed to be implemented using at least one processing platform comprising one or more processing devices each having a processor coupled to a memory. Such processing devices can illustratively include particular arrangements of compute, storage and network resources.

The client devices 102, the order management system 106, the dependent systems 107, the issue database 108 and the order experience issue auto-healing framework 110, or components thereof, may be implemented on respective distinct processing platforms, although numerous other arrangements are possible. For example, in some embodiments at least portions of the client devices 102, the order management system 106, the dependent systems 107, the issue database 108, and the order experience issue auto-healing framework 110, or components thereof, are implemented on the same processing platform.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the client devices 102, the order management system 106, the dependent systems 107, the issue database 108, and the order experience issue auto-healing framework 110, or portions or components thereof, to reside in different data centers. Numerous other distributed implementations are possible.

Additional examples of processing platforms utilized to implement the client devices 102, the order management system 106, the dependent systems 107, the issue database 108, the order experience issue auto-healing framework 110, and other components of the system 100 in illustrative embodiments will be described in more detail below in conjunction with FIGS. 13 and 14.

It is to be appreciated that these and other features of illustrative embodiments are presented by way of example only, and should not be construed as limiting in any way.

An exemplary process for identification and remediation of order experience issues encountered on a user interface of an order management system will now be described in more detail with reference to the flow diagram of FIG. 2. It is to be understood that this particular process is only an example, and that additional or alternative processes for identification and remediation of order experience issues encountered on a user interface of an order management system may be used in other embodiments.

In this embodiment, the process includes steps 200 through 206. These steps are assumed to be performed by an auto-healing framework (e.g., the order experience issue auto-healing framework 110 utilizing the order experience issue capture logic 112 and the order experience issue auto-healing logic 114). The process begins with step 200, identifying a plurality of issues (e.g., order experience issues) encountered on a user interface of a web-based system (e.g., order management system 106), the plurality of issues being associated with one or more data structures (e.g., orders) consolidating data from two or more of a plurality of backend applications (e.g., dependent systems 107) supporting the web-based system. Step 200 may include utilizing a rule-based issue algorithm specifying a plurality of rules for detection of different types of issues. The different types of issues may comprise at least two of system integration related issues, data related issues, user interface experience expectation related issues, and user session related issues. The plurality of rules may comprise two or more of: a missing order status rule for when a user is not shown an order status after placing an order; a missing invoice rule for when an order has shipped but an invoice for the order is not available; a missing tracking link rule for when an order has shipped but an order tracking link is not available; and a missing return email rule for when a return request is raised for an order by not email is sent to a user that initiated the return request.

Figure 2:
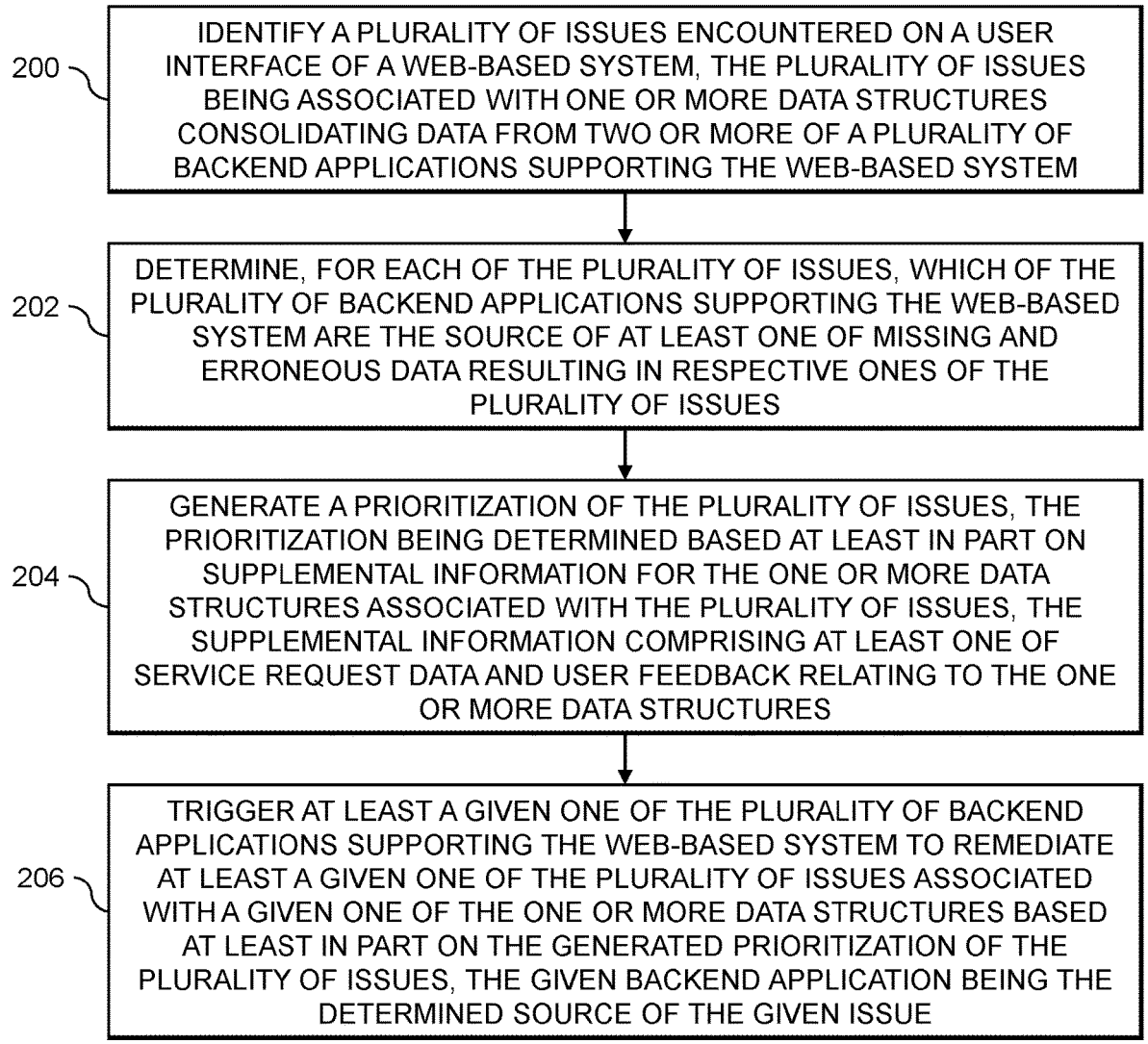
FIG. 2 is a flow diagram of an exemplary process for identification and remediation of issues encountered on a user interface of a web-based system in an illustrative embodiment.

The FIG. 2 process continues with step 202, determining, for each of the plurality of issues, which of the plurality of backend applications supporting the web-based system are the source of at least one of missing and erroneous data resulting in respective ones of the plurality of issues. In step 204, a prioritization of the plurality of issues is generated. The prioritization is determined based at least in part on supplemental information for the one or more data structures associated with the plurality of issues, the supplemental information comprising at least one of service request data and user feedback relating to the one or more data structures. The service request data relating to the one or more data structures may comprise one or more user communication records submitted to a support system associated with the web-based system. The one or more user communication records may comprise at least one of service requests and chat logs for the one or more data structures (e.g., for orders associated with such data structures). The user feedback relating to the one or more data structures may comprise social feed data from one or more social media platforms. Step 204 may be based at least in part on a ranking of a plurality of features associated with the plurality of issues, the plurality of features comprising at least two of user type for one or more orders associated with the one or more data structures, sentiment of the supplemental information, numbers of service requests created for the one or more orders, and frequencies of issues for respective ones of the one or more orders.

In some embodiments, step 204 is based at least in part on sentiment analysis of textual content of the supplemental information, and the sentiment analysis may comprise processing the textual content of the supplemental information utilizing one or more natural language processing (NLP) algorithms. The one or more NLP algorithms may comprise at least one of: mapping non-numeric categorical data in the supplemental information to numeric values utilizing one-hot encoding; and performing at least one of stemming, lemmatization and removal of stop words and unimportant terms from the textual content of the supplemental information. The sentiment analysis may comprise associating a sentiment flag with each of the plurality of issues. The sentiment analysis may utilize a k-means classifier for associating different portions of the textual content of the supplemental information with different sentiment clusters.

In step 206, at least a given one of the plurality of backend applications supporting the web-based system is triggered to remediate at least a given one of the plurality of issues associated with a given one of the one or more data structures based at least in part on the generated prioritization of the plurality of issues, the given backend application being the determined source of the given issue. The FIG. 2 process may further include generating and delivering one or more notifications to at least one client device of at least one user associated with the given data structure, the one or more notifications specifying the remediation of the given issue. The FIG. 2 process may further include, responsive to detecting remediation of the given issue by the given backend application, dynamically updating information related to the given data structure on the user interface of the web-based system.

One of the major challenges for any enterprise is to provide its customers or other users with the right and meaningful information whenever they visit the enterprise's website, mobile applications, etc. It is even more important for the enterprise and its customers or other users when the customers or other users have paid for products and expect them to be delivered. There are plenty of reasons why things can go wrong such that a customer or other user is not getting the right information.

Order support experience, unlike some other user experiences, is crucial for customers or other users since it directly impacts the trust and reliability of any enterprise. With digital transformation across segments, an online order support experience may be adopted across industries and may evolve with more and more self-serve capabilities (e.g., showing the correct order status, downloading or viewing invoices, raising returns, etc.). There are many moving parts for any order to get fulfilled, such as item availability, part availability, factory location, customer location, carrier logistics data, unforeseen challenges, etc. Each of these and other factors can cause delays, such that an enterprise's user interfaces (e.g., an enterprise website, mobile applications, etc.) may not represent or display the right information to provide a seamless experience to the enterprise's customers or other users. This leads to frustration and can impact customer or other user satisfaction for an enterprise. For some enterprises which deal with other large enterprises, orders may contain hundreds or thousands of items which may be required to be shipped to multiple locations. The order support experience in such situations is even more crucial and difficult to handle.

An enterprise may adopt various processes in an attempt to keep data consistent and provide up-to-date information to its customers or other users. Due to system issues or data issues, however, there are still cases where bad data or information is presented to the customers or other users. For example, issues like an expected delivery or shipment data not getting updated, a shipment carrier link not being updated, etc. may occur. Any such occurrences can lead to frustration for the enterprise's customers or other users, and can directly impact the enterprise's brand, revenue, etc. Some issues, such as wrong or incorrect order data being presented to customers or other users, are even more frustrating and can negatively impact the trust of customers or other users in an enterprise, organization or other entity.

To overcome these and other technical challenges, illustrative embodiments provide technical solutions for a proactive and reactive framework for identifying user experience issues and prioritizing such issues for auto-healing. The technical solutions in some embodiments provide an innovative approach to a pluggable framework which detects issues (e.g., bad order attributes, user online experience issues, etc.) being exposed to users and identifies the root causes of the issues. This data (e.g., issues and their root causes) are pushed to a multidimensional data store, where the multidimensional data store can also store other aspects of user context such as service requests created by users, communications sent to users, user order logistics events, user order history, user feedback comments, etc. These data sources are useful for understanding the sentiment and sensitivity of issues. Based on the online visit pattern of a user (e.g., a user's interactions with an entity's websites, mobile applications, etc. related to one or more orders) and the user sentiment derived from the multidimensional data store, the framework prioritizes the issues and triggers events to dependent systems (e.g., dependent applications operated by the entity) to fix relevant data. This framework provides various technical advantages for improving user order support experience, and for prioritizing issues for an entity based on user online experience.

With the growing digital-age industry, the dependence on online information has become increasingly significant, to the extent that online information from the perspective of end-users is held close to the source of truth. Various facilities and services are enabled by online tools offered by an entity, such as tools for downloading order invoices, requesting exchanges and/or returns for one or more items in orders, etc. Such tools make various processes quicker and hassle-free for users. Some entities are moving in the direction of empowering users by providing them transparency with more data to help the users independently self-serve various actions (e.g., tracking orders). Thus, it becomes a priority for entities to ensure quality and consistency of the data and features made available to users.

Consider, for example, an enterprise, organization or other entity which operates an e-commerce platform comprising an order management system providing online order management functionality. The online order management functionality may involve a large number of systems (e.g., dependent applications) which work in the background (e.g., not visible to end-users) to process various data to enable self-serve capabilities of the order management system. The data keeps generating from various resources and channels. In the background systems, there may be some data update issues with new scenarios being generated such as through the integration of different combinations of systems, or edge cases which may be missed. These issues can lead to significant impacts on user order experience. The technical solutions described herein provide an order experience issue auto-healing framework (e.g., the order experience issue auto-healing framework 110) which can resolve these issues (e.g., in real-time or near real-time) before users even realize that there are issues and reach out to support. To resolve such issues, they need to be intelligently and proactively identified first. Various data sources may provide data useful in identifying issues as well as generating insights and patterns which can help to identify the root causes of such issues faster and more efficiently.

Multiple backend systems may be involved in fulfilling orders for an e-commerce platform due to systems issues or gaps. In some instances, data is inaccurate or stale. When an enterprise, organization or other entity allows users to view order details though websites or mobile applications (e.g., as part of an e-commerce platform), there is a high possibility of exposing such inaccurate or stale data to users. This can lead to severe user dissatisfaction and trust issues.

An enterprise system (e.g., an e-commerce platform) may be very complex, such that analysis of issues is a very tedious task. Operations support staff, for example, may need to get to each backend system (e.g., dependent application) to figure out where exactly the data is inaccurate or stale. The technical solutions described herein provide frameworks which can connect various attributes and determine the root cause of issues.

As the volume of users for online platforms (e.g., e-commerce platforms) rises, it is very difficult to keep track of which issues or gaps to prioritize from a user online visit perspective. The lack of connection of user online visits to order-level attributes often makes the entities operating online platforms depend on volumetric-based prioritization of issues. Further, while analysis of issues is one part of the solution, there is also a need for an intelligent framework to pass attributes to the backend systems (e.g., dependent applications) which are the root cause of issues to trigger auto-healing of data inconsistencies according to the issue analysis from the online user order support journey.

Figure 3:
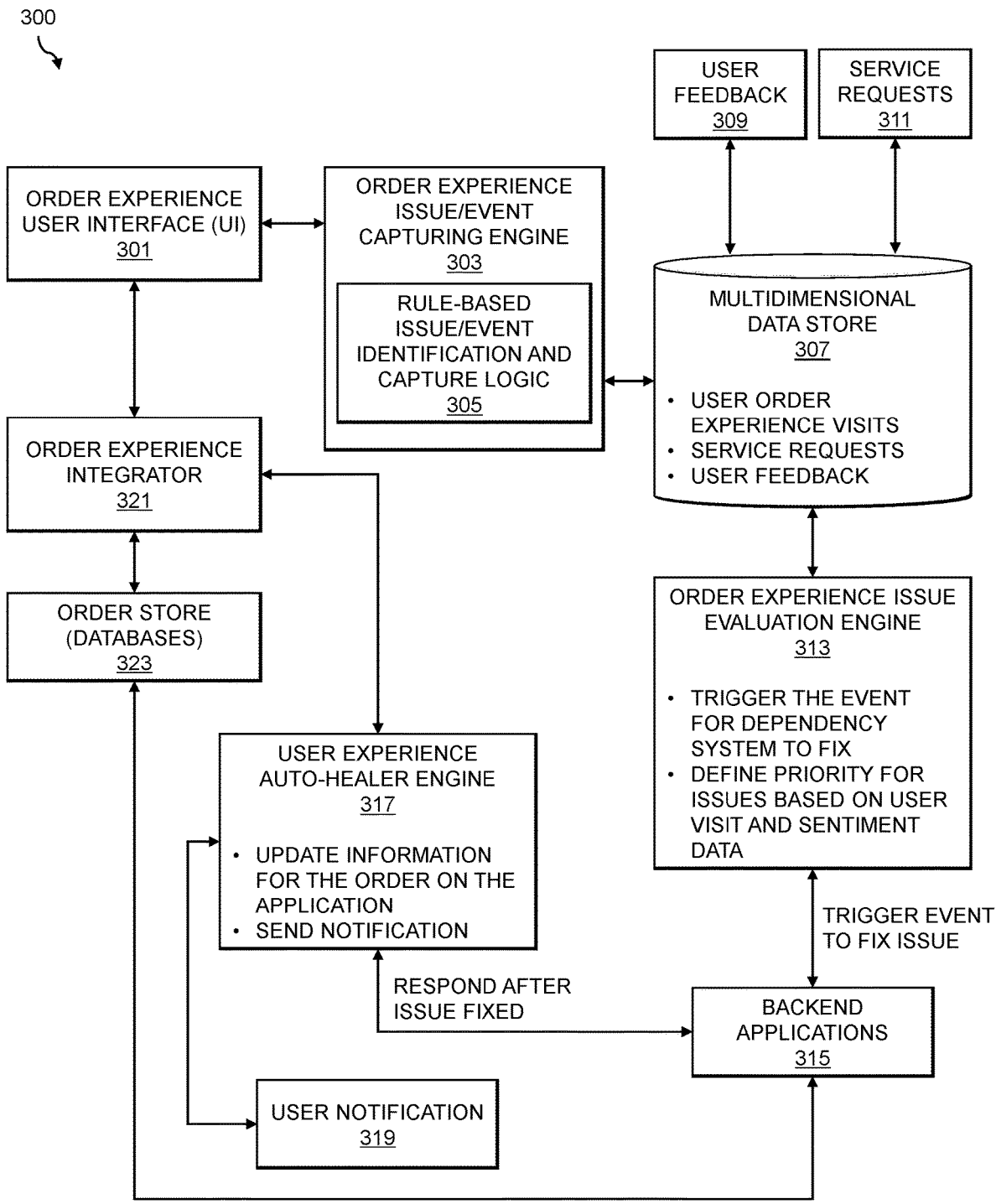
FIG. 3 shows a system implementing an intelligent framework for auto-healing user order experience issues in an illustrative embodiment.

FIG. 3 shows a system 300 implementing an intelligent framework for auto-healing user order experience issues. The system 300 includes an order experience user interface (UI) 301, which renders data for users on a UI (e.g., a graphical user interface or GUI, such as a website, mobile application, etc.). Data (e.g., order data) gets rendered on the UI for users, with the data being based on many consolidations across multiple backend applications 315. For example, order details may need to flow from one or more order management backend applications, while tracking data is shown from one or more logistics backend applications and invoices are generated by one or more finance backend applications. The order experience UI 301 provides to users a consolidated view, with these and other data points as well as various self-service capabilities or functionality. This might lead to data discrepancy and experience gaps for users. An order experience issue/event capturing engine 303 is configured to capture order experience issues which are encountered on the order experience UI 301. To do so, the order experience issue/event capturing engine 303 implements rule-based issue/event identification and capture logic 305, which is configured to: (1) capture issues based on rules defined (e.g., comparing what is presented to the user via the order experience UI 301 with an ideal, perfect or model consolidated view); and (2) capture events based on user actions taken relating to orders (e.g., raising requests, downloading invoices, etc.).

The order experience issue/event capturing engine 303 is configured to provide captured issues and events to a multidimensional data store 307. The multidimensional data store 307 is configured to enrich the captured issues/events with information from multiple sources, such as user feedback 309 and service requests 311, in order to define the prioritization of issues and analyze the root causes of issues (e.g., orders with faulty order attributes). The multidimensional data store 307 may ingest messages or other data from various sources which are associated with order management, fulfillment, logistics, invoicing, user comments, Customer Relationship Management (CRM) tools, etc.

The system 300 includes an order experience issue evaluation engine 313, which is configured to utilize the information stored in the multidimensional data store 307 to identify the priority of issues and notify or trigger the backend applications 315 (e.g., which are the root causes of identified issues) to fix them. The order experience issue evaluation engine 313 is responsible for deciding the priority of detected issues and predicting the respective backend applications 315 (e.g., backend systems) which can fix the detected issues. The prioritization of issues may be based at least in part on user visit and sentiment data. In some embodiments, the order experience issue evaluation engine 313 leverages one or more machine learning algorithms trained using historical data of user experience issues, fixes, interlock systems, root cause analysis, and critical order-related attributes (e.g., user segment, order value, entitlement of the user, order stage, etc.).

The order experience issue evaluation engine 313 triggers events for fixing detected issues in the backend applications 315. After the detected issues are fixed, the backend applications may respond or notify a user experience auto-healer engine 317. The user experience auto-healer engine 317 is configured to identify the appropriate actions for communicating updates to users, such as by initiating user notification 319, or by updating the order experience UI 301 via an order experience integrator 321. The order experience integrator 321 may provide information to be rendered on the order experience UI, where such information may be obtained from an order store 323 (e.g., one or more databases) which may include information provided from one or more of the backend applications 315.

The first step in auto-healing an issue is to capture the right issue that is being exposed. In the order experience UI 301 (e.g., of an order management system), there may be multiple different types of issues which may be broadly categorized into areas such as system integration related issues, data issues, UI experience expectation issues, and user session related issues. The order experience issue/event capturing engine 303 focuses on user behaviors and issues faced by users when they visit the order experience UI 301 (e.g., for order details and updates). The rule-based issue/event identification and capture logic 305 may maintain a set of rules which helps to identify the orders and users facing issues. Some example rules defined by the framework include:

1. Missing Order Status: when order status is not shown to the user after placing an order, then record the order and user details into the multidimensional data store 307 as a "Missing Order Status" issue.
2. Missing Invoice: when an order has already shipped but an invoice is not available, then record the order and user details into the multidimensional data store 307 as a "Missing Invoice" issue.
3. Missing Tracking Link: when an order has shipped but an order tracking link is not available, then record the order and user details into the multidimensional data store 307 as a "Missing Tracking Link" issue.
4. Missing Return Email: when a return request is raised for an order but no email is sent to the user, then record the order and user details into the multidimensional data store 307 as a "Missing Return Email" issue.

Data which is shown to a user via the order experience UI 301 may be retrieved by different sources (e.g., backend applications 315) and is parsed through the rules defined by the rule-based issue/event identification and capture logic 305 of the order experience issue/event capturing engine 303. Once a rule identifies a potential problem with data, it gets persisted into the multidimensional data store 307. It should be noted that the rules may be complex depending on how data needs to be rectified.

To analyze issues, the system 300 utilizes different views of the user activity on the order experience UI 301. Issues may be related to system issues, data issues, and what the user has done to resolve such issues. Identifying data sources required to capture a 360-degree view of issue occurrences is thus important for evaluating the urgency and priority of issues. The multidimensional data store 307 is configured to hold various data related to issue occurrence and user context (e.g., from the order experience UI 301 via the order experience issue/event capturing engine 303), user feedback 309 and service requests 311. FIG. 4 shows sample data models for holding such data and relating them to captured issues, including a data model for user visit data 401, service case data 403, social feed data 405 and ranking data 407.

Figure 5:
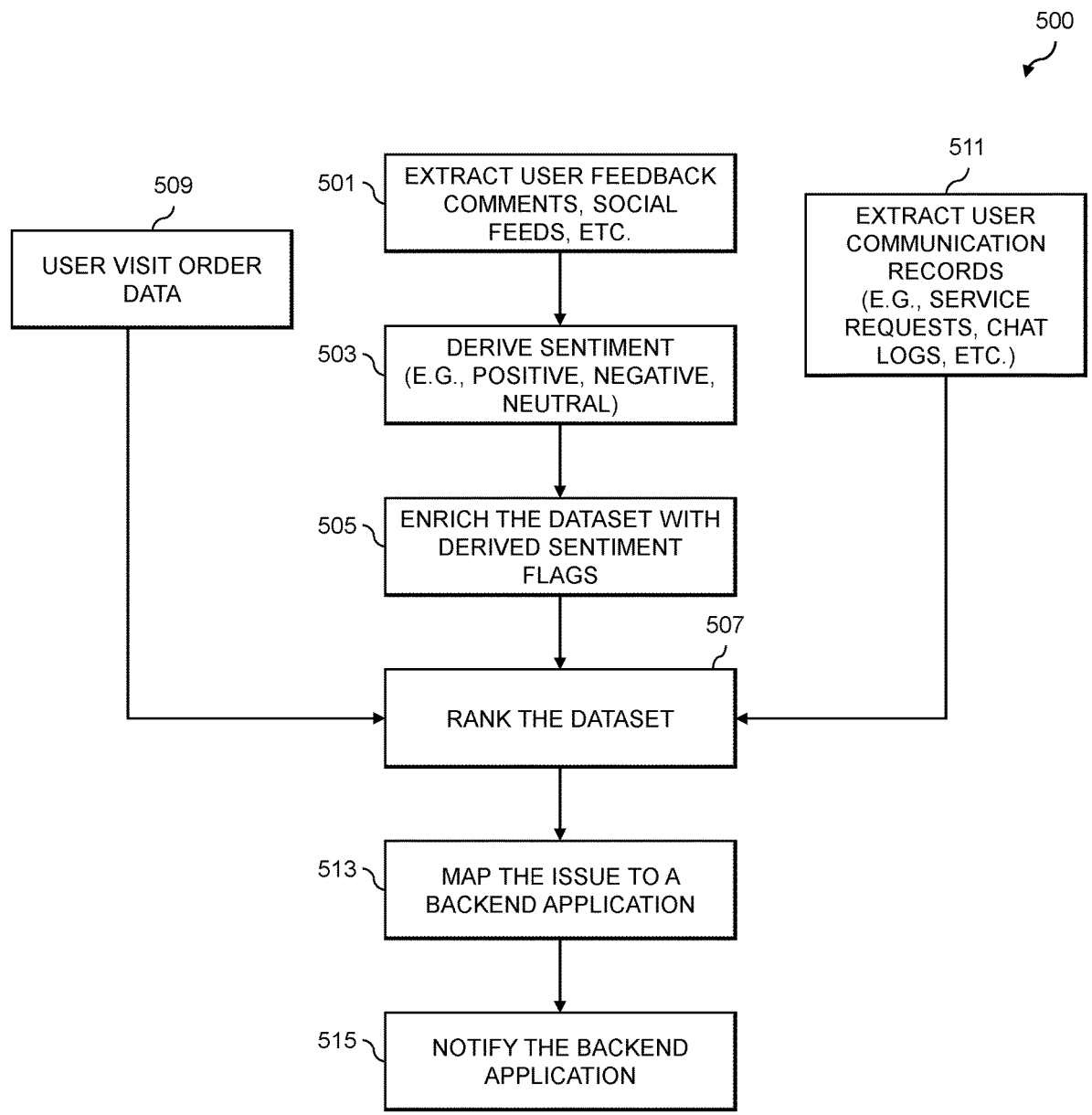
FIG. 5 shows a process flow for evaluating different types of data for ranking and prioritizing user order experience issues in an illustrative embodiment.

The order experience issue evaluation engine 313 provides a framework for evaluating various data from the multidimensional data store 307. FIG. 5 shows a process flow 500 which may be implemented by the order experience issue evaluation engine 313. In step 501, user feedback comments, social feeds, etc. are extracted (e.g., from user feedback 309 persisted in the multidimensional data store 307). In step 503, sentiment is derived from the extracted user feedback comments, social feeds, etc. In some embodiments, the derived sentiment is one of positive, negative and neutral. In other embodiments, other types of sentiment may be derived. In step 505, the dataset is enriched with derived sentiment flags. The dataset is then ranked in step 507. The dataset ranking in step 507 also takes into account user visit order data 509 and extracted user communication records 511 (e.g., service requests, chat logs, etc.). In step 513, the issue is mapped to one of the backend applications 315. The mapped backend application is then notified of the issue in step 515.

FIG. 6 shows an example of user visit data 601 (e.g., a first data source providing the user visit order data 509), service case data 603 (e.g., a second data source providing the extracted user communication records 511), and social feed data 605 (e.g., a third data source providing the user feedback comments, social feeds, etc. extracted in step 501). The user visit data 601 may include user and order data such as user type, order amount, sales revenue earned, order experience issue of the user order, etc. These attributes play a major role in calculating the "distress" of the issue. The distress, also denoted D, is further used to calculate the ranking of issues for auto-healing. The distress D is a calculation of the distress of user experience issues based on user and order data. The service case data 603 includes case or service requests raised by users on the impacted order number. User service requests are mapped with user experience issues based on the order number, and add up to the distress ranking score D as a calculation of mapping of online experience issue type to service requests based on service request features. The social feed data 605 adds sentiment prioritization from user comments on the order numbers from the online experience. The sentiment may be processed though, for example, a natural language processing (NLP) engine leveraging the Natural Language Toolkit (NLTK). Sentiment analysis information retrieval gathers unstructured and unorganized textual contents from user feedback comments, social platforms (e.g., including online sources such as chat feeds happening across the social platforms), etc. The sentiment coming from online sources (e.g., feedback, social media feeds, etc.) is computed to calculate the user distress sentiment D as a calculation of user sentiment distress based on feedback and social media interaction on orders.

Exploratory Data Analysis (EDA), feature engineering and selection will now be described. In some cases, user feedback and social media feeds include non-numeric categorical data. Non-numeric categorical data for country, rating and reported issues may be mapped to numerical values using one-hot encoding. FIG. 7, for example, shows pseudocode 701 and 703 for mapping non-numeric country and issue type data. User feedback and social media feeds may include comments made by users. The comments may include sentiments, which are used to figure out the pain points in auto-healing mechanisms. For extracting the exact problem, the comments and feeds may be subject to various NLP such as stemming, lemmatization, removal of stop words and unimportant terms, etc. FIG. 8 shows various pseudocode 801, 803, 805 and 807 for such NLP tasks. To map comments into numerical decimals (e.g., between 0 and 1), a hashing vectorizer tool is used for large datasets which converts text documents into a sparse matrix and every column includes a token occurrence. FIG. 8 also shows pseudocode 809 for implementing the hashing vectorizer tool.

Model evaluation will now be described. Incoming data is assumed to be unstructured and without labels. The data may be classified according to sentiment (e.g., positive, average/neutral, negative, etc.) using an unsupervised machine learning algorithm such as a K-means classifier. The K-means classifier implements an algorithm for solving an optimization problem where the function to be optimized (e.g., minimized) is the sum of the quadratic distances from each object to its cluster centroid. The objects are represented with d vectors $d_1, d_2, \ldots d_d$. The k-means algorithm builds k groups where the sum of the distances of the objects to its centroid is minimized within each group $S=\{S_1, S_2, \ldots, S_k\}$. The problem can be formulated as:

$$\min_s E(\mu_i) = \min_s \sum_{i=1}^{k} \sum_{x_j \in S_i} \|x_j - \mu_i\|^2$$

FIG. 9 shows pseudocode 901 and 903 for implementing the K-means classifier and prediction mapping. FIG. 9 also shows a table 905 of rating predictions for comments (e.g., cleaned verbatim text) for different fiscal weeks. The model classifies the comments into the sections in ascending order of good to bad, where the range in this example goes from 0 (good comments), to 1 (better comments), to 2 (pain causing comments), to 3 (extremely pain causing comments).

The order experience information is collected from various perspectives, which enables the framework to understand the impact of issues and help decide the priority or ranking in which the issues should be taken up for resolution (e.g., by the backend applications 315). In some embodiments, the following ranking formula is followed:

$$\sum_{i=0}^{n} F_i W_i = F_1 W_1 + F_2 W_2 + \ldots + F_n W_n, \text{ where } W_i = (n-i)$$

F denotes features obtained from the above algorithm calculations, while W denotes the weight assigned to each feature based on its priority, and i denotes the priority of each feature.

Important features are selected from the classification of the data coming from various data sources to rank the issues. The priority is given to user attributes and then the order attributes. After setting the priority, the weight is assigned to each feature in descending order starting from the total number of features. The important features may be identified and evaluated from the different sources as described above. The priority of these features to be considered helps identify the rank. FIG. 10 shows a table 1000 showing an example of setting the ranking for issues for a Premier/Partner Business-to-Business (BWB) user. FIG. 11 shows pseudocode 1100 for performing the ranking. Priority is given to the calculated scores in descending order. If the score comes out to be the same, the most recent logged date of the issue found is considered to resolve the priority. Based on the issue, the dependent teams (e.g., ones of the backend applications 315) are identified and notified. This insight of the on-ground impact along with the user experience data enables the dependent teams to analyze the user case and resolve gaps quicker. Thus, the turnaround time for identifying and resolving issues from the root decreases, controlling the impact of gaps in the system.

Figure 12:
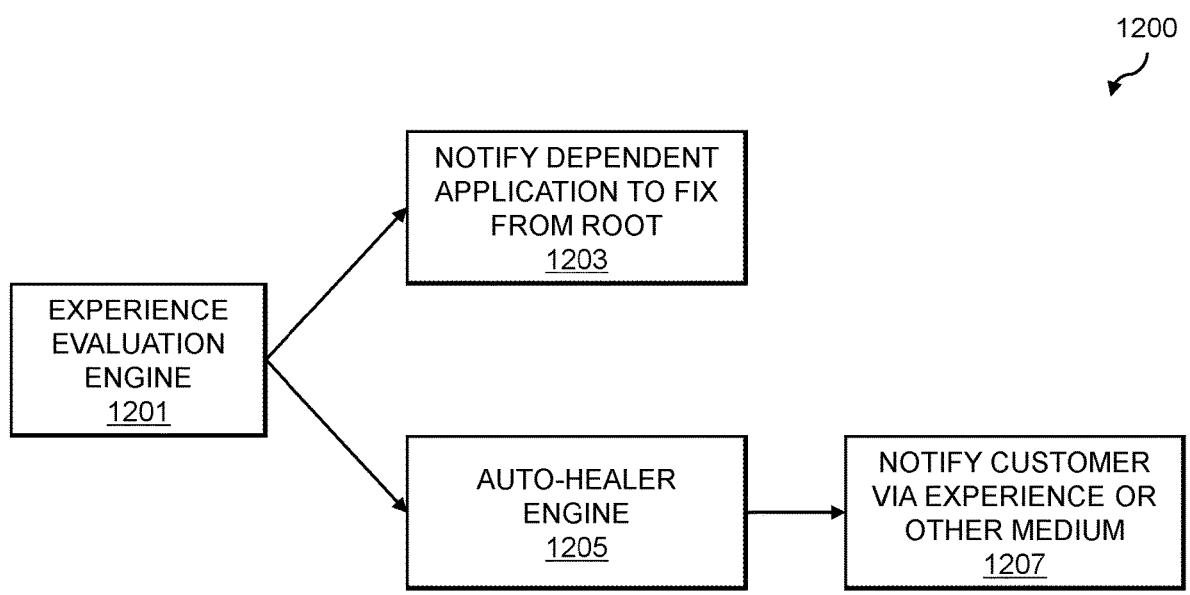
FIG. 12 shows a system for implementation of auto-healing of user order experience issues in an illustrative embodiment.

FIG. 12 shows a system 1200 for an implementation of an auto-healer module, with the system 1200 include an experience evaluation engine 1201 (e.g., an example of the order experience issue evaluation engine 313 in the system 300) and an auto-healer engine 1205 (e.g., an example of the user experience auto-healer engine 317 in the system 300). The experience evaluation engine 1201 will notify dependent applications (e.g., backend applications 315) which are determined to be the root cause of issues to work on fixing the issues from the root in block 1203. The auto-healer engine 1205 is configured to provide users with personalized experience in the form of alternative solutions in the case of gaps to ensure that the users are well-informed and are not worried about issues in block 1207. For example, when a missing invoice issue is identified for an order in the order experience UI 301, the invoice may be sent to the appropriate user either via the order experience UI 301 or over another communication channel (e.g., an out-of-band communication channel relative to the order experience UI 301, such as over email). As another example, when a carrier link missing issue is identified for an order, based on the carrier, the carrier details can be fetched and displayed to the user either via the order experience UI 301 or another communication channel. As a further example, if an order is not delivered by its promised data, a message can be shown either via the order experience UI 301 or another communication channel to allow the user to track the order with the carrier.

The technical solutions described herein advantageously provide frameworks which help bridge the gap between the user experience and backend systems, to take proactive and reactive actions ensuring user satisfaction. Proactive mechanisms include, for example, when a user visits the order experience UI 301, any issues and their root causes are identified by the system itself (e.g., without the user raising such issues) and corresponding solutions are proactively triggered (e.g., in the backend applications 315) without the user having to reach out through any medium. Reactive mechanisms include, for example, when a user faces a gap or issue in the order experience UI 301 and raises concerns through user feedback 309 (e.g., user feedback forms, social media, etc.) or service requests 311, it becomes necessary to take quicker actions. In this case, the order experience data (e.g., issues/events captured by the order experience issue/event capturing engine 303 and stored in the multidimensional data store 307) can be evaluated to quickly map to the issue and resolve the issue accordingly. In some embodiments, the technical solutions integrate user sentiment, user cases and user visit history together to derive prioritization to address order experience issues. The technical solutions can then evaluate the prioritization of issues and trigger dependency systems (e.g., the backend applications 315) to correct the issues and use the response for auto-healing the order experience.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for identification and remediation of order experience issues encountered on a user interface of an order management system will now be described in greater detail with reference to FIGS. 13 and 14. Although described in the context of system 100, these platforms may also be used to implement at least portions of other information processing systems in other embodiments.

Figure 13:
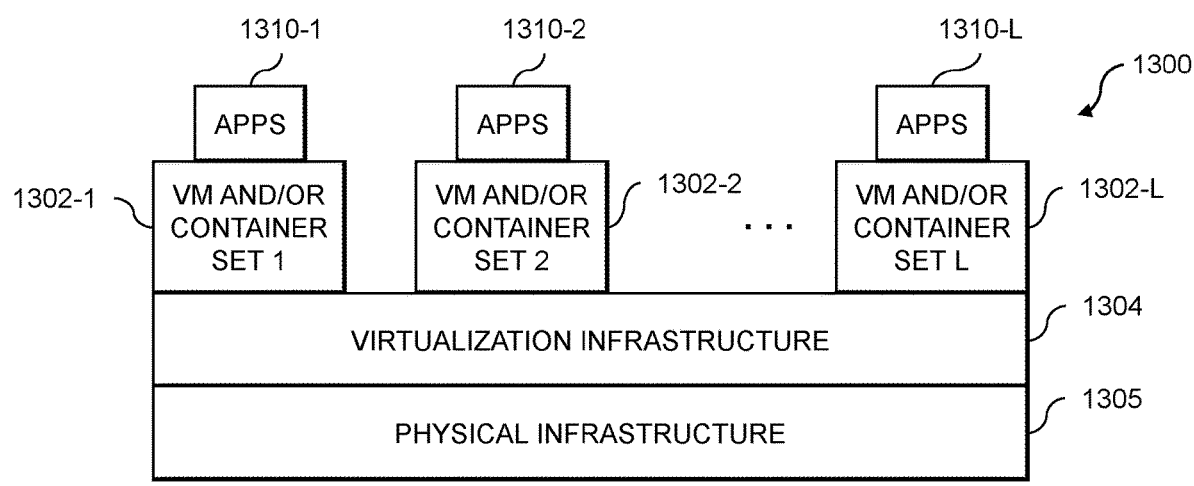
FIGS. 13 and 14 show examples of processing platforms that may be utilized to implement at least a portion of an information processing system in illustrative embodiments.
Figure 14:
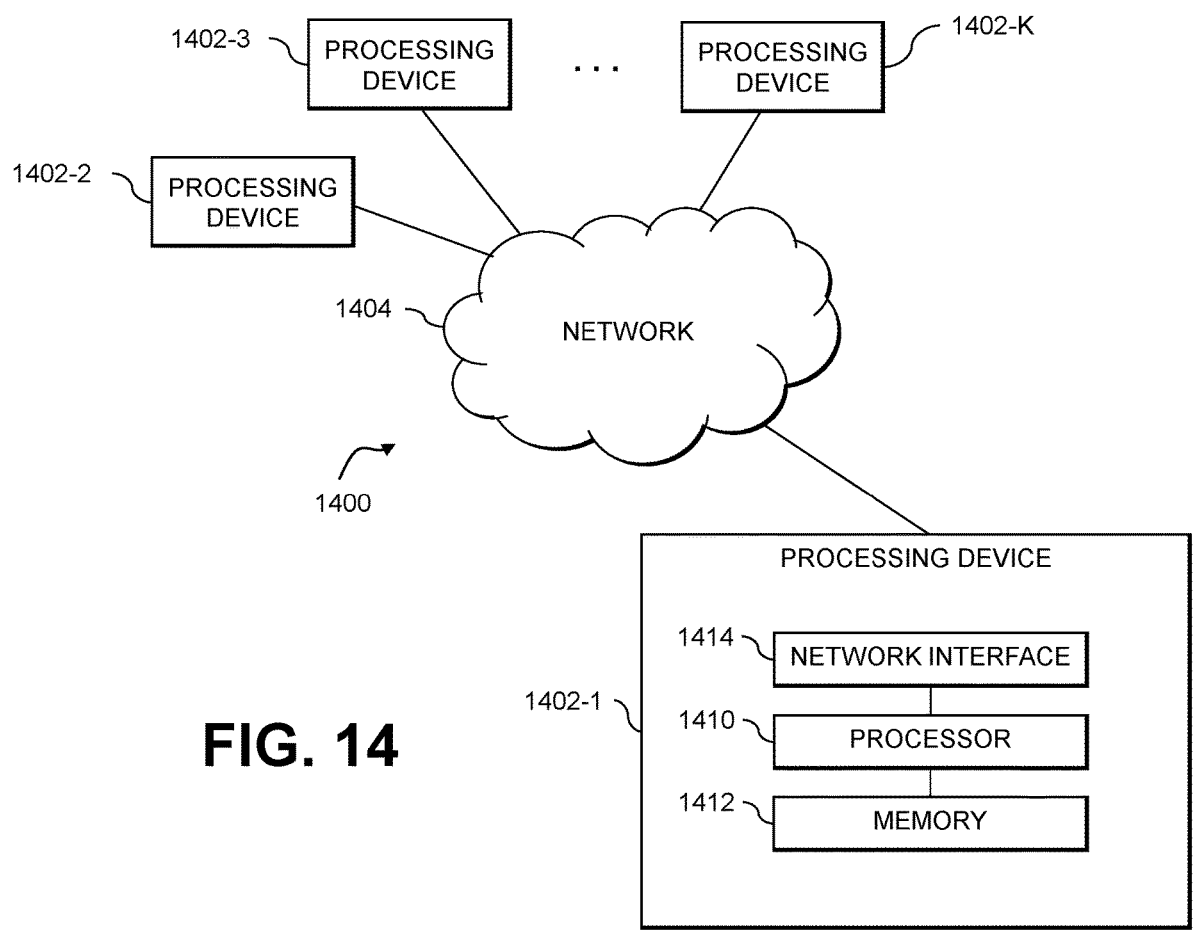

FIG. 13 shows an example processing platform comprising cloud infrastructure 1300. The cloud infrastructure 1300 comprises a combination of physical and virtual processing resources that may be utilized to implement at least a portion of the information processing system 100 in FIG. 1. The cloud infrastructure 1300 comprises multiple virtual machines (VMs) and/or container sets 1302-1, 1302-2, . . . 1302-L implemented using virtualization infrastructure 1304. The virtualization infrastructure 1304 runs on physical infrastructure 1305, and illustratively comprises one or more hypervisors and/or operating system level virtualization infrastructure. The operating system level virtualization infrastructure illustratively comprises kernel control groups of a Linux operating system or other type of operating system.

The cloud infrastructure 1300 further comprises sets of applications 1310-1, 1310-2, . . . 1310-L running on respective ones of the VMs/container sets 1302-1, 1302-2, . . . 1302-L under the control of the virtualization infrastructure 1304. The VMs/container sets 1302 may comprise respective VMs, respective sets of one or more containers, or respective sets of one or more containers running in VMs.

In some implementations of the FIG. 13 embodiment, the VMs/container sets 1302 comprise respective VMs implemented using virtualization infrastructure 1304 that comprises at least one hypervisor. A hypervisor platform may be used to implement a hypervisor within the virtualization infrastructure 1304, where the hypervisor platform has an associated virtual infrastructure management system. The underlying physical machines may comprise one or more distributed processing platforms that include one or more storage systems.

In other implementations of the FIG. 13 embodiment, the VMs/container sets 1302 comprise respective containers implemented using virtualization infrastructure 1304 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1300 shown in FIG. 13 may represent at least a portion of one processing platform. Another example of such a processing platform is processing platform 1400 shown in FIG. 14.

The processing platform 1400 in this embodiment comprises a portion of system 100 and includes a plurality of processing devices, denoted 1402-1, 1402-2, 1402-3, . . . 1402-K, which communicate with one another over a network 1404.

The network 1404 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1402-1 in the processing platform 1400 comprises a processor 1410 coupled to a memory 1412.

The processor 1410 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1412 may comprise random access memory (RAM), read-only memory (ROM), flash memory or other types of memory, in any combination. The memory 1412 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1402-1 is network interface circuitry 1414, which is used to interface the processing device with the network 1404 and other system components, and may comprise conventional transceivers.

The other processing devices 1402 of the processing platform 1400 are assumed to be configured in a manner similar to that shown for processing device 1402-1 in the figure.

Again, the particular processing platform 1400 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for identification and remediation of order experience issues encountered on a user interface of an order management system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, computing devices, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing device comprising a processor coupled to a memory;
   the at least one processing device being configured:
   to identify a plurality of issues encountered on a user interface of a web-based system, the plurality of issues being associated with one or more data structures consolidating data from two or more of a plurality of backend applications supporting the web-based system;
   to determine, for each of the plurality of issues, which of the plurality of backend applications supporting the web-based system are the source of at least one of missing and erroneous data resulting in respective ones of the plurality of issues;
   to generate a prioritization of the plurality of issues, the prioritization being determined based at least in part on supplemental information for the one or more data structures associated with the plurality of issues, the supplemental information comprising at least one of service request data and user feedback relating to the one or more data structures; and
   to trigger at least a given one of the plurality of backend applications supporting the web-based system to remediate at least a given one of the plurality of issues associated with a given one of the one or more data structures based at least in part on the generated prioritization of the plurality of issues, the given backend application being the determined source of the given issue.

2. The apparatus of claim 1 wherein the web-based system implements an order management system, the one or more data structures are associated with one or more orders, and the plurality of issues encountered on the user interface of the web-based system comprise order experience issues associated with the one or more orders.

3. The apparatus of claim 1 wherein identifying the plurality of issues encountered on the user interface of the web-based system comprises utilizing a rule-based issue algorithm specifying a plurality of rules for detection of different types of issues.

4. The apparatus of claim 3 wherein the plurality of rules comprise two or more of:
   a missing order status rule for when a user is not shown an order status after placing an order;
   a missing invoice rule for when an order has shipped but an invoice for the order is not available;
   a missing tracking link rule for when an order has shipped but an order tracking link is not available; and
   a missing return email rule for when a return request is raised for an order but no email is sent to a user that initiated the return request.

5. The apparatus of claim 1 wherein generating the prioritization of the plurality of issues is based at least in part on sentiment analysis of textual content of the supplemental information, and wherein the sentiment analysis comprises processing the textual content of the supplemental information utilizing one or more natural language processing algorithms.

6. The apparatus of claim 5 wherein the one or more natural language processing algorithms comprise at least one of:
   mapping non-numeric categorical data in the supplemental information to numeric values utilizing one-hot encoding; and
   performing at least one of stemming, lemmatization and removal of stop words and unimportant terms from the textual content of the supplemental information.

7. The apparatus of claim 5 wherein the sentiment analysis comprises associating a sentiment flag with each of the plurality of issues.

8. The apparatus of claim 5 wherein the sentiment analysis utilizes a k-means classifier for associating different portions of the textual content of the supplemental information with different sentiment clusters.

9. The apparatus of claim 1 wherein the service request data relating to the one or more data structures comprises one or more user communication records submitted to a support system associated with the web-based system.

10. The apparatus of claim 9 wherein the one or more user communication records comprise at least one of service requests and chat logs for one or more orders associated with the one or more data structures.

11. The apparatus of claim 1 wherein the user feedback relating to the one or more data structures comprises social feed data from one or more social media platforms.

12. The apparatus of claim 1 wherein generating the prioritization of the plurality of issues is based at least in part on a ranking of a plurality of features associated with the plurality of issues, the plurality of features comprising at least two of user type for one or more orders associated with the one or more data structures, sentiment of the supplemental information, numbers of service requests created for the one or more orders associated with the one or more data structures, and frequencies of issues for respective ones of the one or more orders associated with the one or more data structures.

13. The apparatus of claim 1 wherein the at least one processing device is further configured to generate and deliver one or more notifications to at least one client device of at least one user associated with the given data structure, the one or more notifications specifying a remediation of the given issue.

14. The apparatus of claim 1 wherein the at least one processing device is further configured, responsive to detecting a remediation of the given issue by the given backend application, to dynamically update information related to the given data structure on the user interface of the web-based system.

15. A computer program product comprising a non-transitory processor-readable storage medium having stored therein program code of one or more software programs, wherein the program code when executed by at least one processing device causes the at least one processing device:
   to identify a plurality of issues encountered on a user interface of a web-based system, the plurality of issues being associated with one or more data structures consolidating data from two or more of a plurality of backend applications supporting the web-based system;
   to determine, for each of the plurality of issues, which of the plurality of backend applications supporting the web-based system are the source of at least one of missing and erroneous data resulting in respective ones of the plurality of issues;
   to generate a prioritization of the plurality of issues, the prioritization being determined based at least in part on supplemental information for the one or more data structures associated with the plurality of issues, the supplemental information comprising at least one of service request data and user feedback relating to the one or more data structures; and
   to trigger at least a given one of the plurality of backend applications supporting the web-based system to remediate at least a given one of the plurality of issues associated with a given one of the one or more data structures based at least in part on the generated prioritization of the plurality of issues, the given backend application being the determined source of the given issue.

16. The computer program product of claim 15 wherein the program code when executed further causes the at least one processing device to generate and deliver one or more notifications to at least one client device of at least one user associated with the given data structure, the one or more notifications specifying a remediation of the given issue.

17. The computer program product of claim 15 wherein the program code when executed further causes the at least one processing device, responsive to detecting a remediation of the given issue by the given backend application, to dynamically update information related to the given data structure on the user interface of the web-based system.

18. A method comprising:
   identifying a plurality of issues encountered on a user interface of a web-based system, the plurality of issues being associated with one or more data structures consolidating data from two or more of a plurality of backend applications supporting the web-based system;
   determining, for each of the plurality of issues, which of the plurality of backend applications supporting the web-based system are the source of at least one of missing and erroneous data resulting in respective ones of the plurality of issues;
   generating a prioritization of the plurality of issues, the prioritization being determined based at least in part on supplemental information for the one or more data structures associated with the plurality of issues, the supplemental information comprising at least one of service request data and user feedback relating to the one or more data structures; and
   triggering at least a given one of the plurality of backend applications supporting the web-based system to remediate at least a given one of the plurality of issues associated with a given one of the one or more data structures based at least in part on the generated prioritization of the plurality of issues, the given backend application being the determined source of the given issue;
   wherein the method is performed by at least one processing device comprising a processor coupled to a memory.

19. The method of claim 18 further comprising generating and delivering one or more notifications to at least one client device of at least one user associated with the given data structure, the one or more notifications specifying a remediation of the given issue.

20. The method of claim 18 further comprising, responsive to detecting a remediation of the given issue by the given backend application, dynamically updating information related to the given data structure on the user interface of the web-based system.

* * * * *